(12) United States Patent
Zhou et al.

(10) Patent No.: US 10,908,941 B2
(45) Date of Patent: Feb. 2, 2021

(54) TIMESTAMPING DATA RECEIVED BY MONITORING SYSTEM IN NFV

(71) Applicant: TEKTRONIX TEXAS, LLC., Westford, MA (US)

(72) Inventors: Tianlin Zhou, Shanghai (CN); Yang He, Shanghai (CN)

(73) Assignee: Tektronix Texas, LLC, Westford, MA (US)

( * ) Notice: Subject to any disclaimer, the term of this patent is extended or adjusted under 35 U.S.C. 154(b) by 144 days.

(21) Appl. No.: 16/083,421

(22) PCT Filed: Mar. 11, 2016

(86) PCT No.: PCT/US2016/022094
§ 371 (c)(1),
(2) Date: Sep. 7, 2018

(87) PCT Pub. No.: WO2017/155545
PCT Pub. Date: Sep. 14, 2017

(65) Prior Publication Data
US 2019/0056972 A1    Feb. 21, 2019

(51) Int. Cl.
*G06F 9/455* (2018.01)
*G06F 11/30* (2006.01)
(Continued)

(52) U.S. Cl.
CPC ...... *G06F 9/45558* (2013.01); *G06F 9/45533* (2013.01); *G06F 9/54* (2013.01);
(Continued)

(58) Field of Classification Search
None
See application file for complete search history.

(56) References Cited

U.S. PATENT DOCUMENTS

2005/0058149 A1   3/2005 Howe
2008/0144624 A1   6/2008 Marcondes et al.
(Continued)

FOREIGN PATENT DOCUMENTS

CN       105357151 A      2/2016
WO   WO-2015121750 A1    8/2015

OTHER PUBLICATIONS

International Search Report and Written Opinion for PCT Application No. PCT/US2016/022094, dated Dec. 5, 2016.

*Primary Examiner* — Kenneth Tang
(74) *Attorney, Agent, or Firm* — Locke Lord LLP; Scott D. Wofsy; Christopher J. Capelli

(57) ABSTRACT

A network traffic monitoring system is provided. The system includes a host computer executing a plurality of virtual machines (VMs), including a monitoring VM and a virtual switch (vSwitch). The vSwitch includes a plurality of virtual Network Interface Cards (vNICs) associated with the plurality of VMs. The monitoring VM is coupled to the vSwitch and executed by the host computer. The vSwitch is configured to mirror a plurality of data packets exchanged between two communicating VMs to a vNIC associated with the monitoring VM. The monitoring VM is configured to retrieve the plurality of mirrored data packets from the vNIC associated with the monitoring VM. The monitoring VM is further configured to generate timestamps indicative of packet arrival time at the vSwitch for each data packet in the retrieved plurality based, at least in part, on a computed base time.

15 Claims, 6 Drawing Sheets

(51) Int. Cl.
  *G06F 9/54* (2006.01)
  *H04L 12/26* (2006.01)
(52) U.S. Cl.
  CPC ............ *G06F 11/30* (2013.01); *H04L 43/106* (2013.01); *G06F 9/544* (2013.01); *G06F 2009/45591* (2013.01)

(56) References Cited

U.S. PATENT DOCUMENTS

| | | |
|---|---|---|
| 2013/0297768 A1 | 11/2013 | Singh |
| 2016/0112182 A1* | 4/2016 | Karnes ................... H04J 3/0697 375/362 |
| 2016/0380859 A1* | 12/2016 | Edsall ................... H04L 43/028 370/252 |
| 2017/0093677 A1* | 3/2017 | Skerry ................... H04L 43/12 |
| 2017/0163602 A1* | 6/2017 | Douglass ............ H04L 63/0227 |
| 2017/0180273 A1* | 6/2017 | Daly ........................ H04L 69/22 |
| 2017/0222909 A1* | 8/2017 | Sadana ................. H04L 43/106 |
| 2017/0302595 A1* | 10/2017 | Tripathi .................. H04L 49/25 |
| 2019/0081959 A1* | 3/2019 | Yadav ..................... H04L 43/04 |

* cited by examiner

US 10,908,941 B2

TIMESTAMPING DATA RECEIVED BY MONITORING SYSTEM IN NFV

CROSS REFERENCE TO RELATED APPLICATIONS

This application is the U.S. National Stage of PCT International Application No. PCT/US2016/022094, filed Mar. 11, 2016, the entire disclosure of which is hereby incorporated herein by reference in its entirety.

FIELD OF THE INVENTION

This specification is directed, in general, to network monitoring and more particularly, to a method for timestamping data received by monitoring system in Network Function Virtualization (NFV) environment.

BACKGROUND OF THE INVENTION

One of the methods for synchronizing clocks in packet-switched data networks is Network Time Protocol (NTP). Commercial NTP servers typically employ highly accurate hardware based clocks, which are disciplined to the external standards. In turn, NTP clients send carefully crafted packets to NTP servers and analyze their replies in order to determine the offset of the client clock relative to the server clock. A typical packet contains four timestamps. The timestamps are designed to precisely time transmit and receive paths of the client/server time packet interchange so that the roundtrip delay between the endpoints and the offset of the client clock may be calculated.

NFV (network function virtualization) is an industry effort to virtualize network equipment using a general-build hardware platform to provide cost reduction, operation efficiency and agility. European Telecommunications Standards Institute (ETSI) NFV Industry Specification Group (ISG) is the organization developing a framework for NFV. NFV is the principle of separating network functions from the hardware they run on through virtual hardware abstraction. No general hardware clock signal can be used in such virtual platform for timestamping purposes.

Accordingly, it would be advantageous to provide an efficient software clocking solution consistently delivering accurate results.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a monitoring system is described in which an illustrated embodiment includes a host computer executing a plurality of virtual machines under the control of a hypervisor. At least one of the plurality of virtual machines includes a monitoring virtual machine. The monitoring system includes a virtual switch of the host machine. The virtual switch includes a plurality of virtual Network Interface Cards (vNICs). Each vNIC of the plurality of vNICs is associated with a virtual machine of the plurality of virtual machines. The monitoring virtual machine has access to a packet capture Application Program Interface (API). The monitoring virtual machine is coupled to the virtual switch and executed by the host computer. The virtual switch is configured to mirror a plurality of data packets exchanged between two communicating virtual machines to a vNIC associated with the monitoring virtual machine. The monitoring virtual machine is configured and operable to retrieve the plurality of mirrored data packets from the vNIC associated with the monitoring virtual machine using the packet capture API. The monitoring virtual machine is further configured and operable to generate timestamps indicative of packet arrival time at the virtual switch for each data packet in the retrieved plurality of mirrored data packets based, at least in part, on a computed base time.

In another aspect, a method for monitoring a plurality of virtual machines communicatively coupled to a virtual switch with a plurality of virtual Network Interface Cards (vNICs) using a monitoring virtual machine communicatively coupled to the virtual switch is provided. A plurality of data packets exchanged between two communicating monitored virtual machines is mirrored by the virtual switch to a vNIC associated with the monitoring virtual machine. The plurality of mirrored data packets is retrieved by the monitoring virtual machine from the vNIC associated with the monitoring virtual machine. Timestamps indicative of packet arrival time at the virtual switch are generated by the monitoring virtual machine for each data packet in the retrieved plurality of mirrored data packets based, at least in part, on a computed base time.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
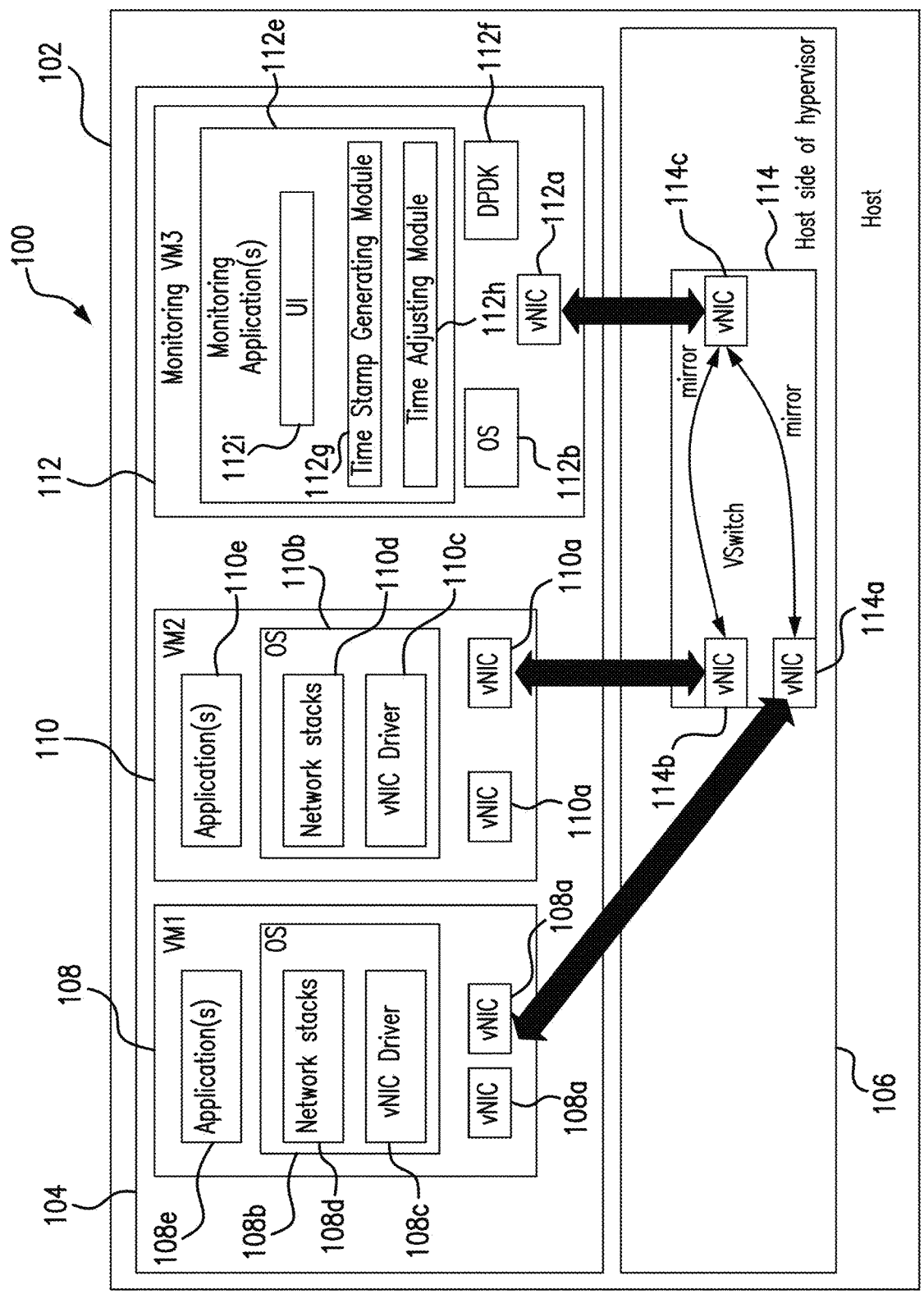
FIG. 1 is a schematic diagram illustrating monitoring of a host computing system running a virtual environment in accordance with one or more embodiments.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein. One skilled in the art will appreciate further features and advantages of the invention based on the below-described embodiments. Accordingly, the invention is not to be limited by what has been particularly shown and described, except as indicated by the appended claims.

Disclosed herein is a system that virtualizes at least a portion of a physical network device using NFV. The NFV virtualization may virtualize the physical network device by dividing a physical network device into a plurality of NFs. Each of the NFs is configured to perform a network function typically implemented by the physical network device. A virtual container may host one or more of the NFs to address network scalability, expansion, and migration issues associated with the physical network device. The NFV virtualization may group and place the NFs within a virtual container using any one of the following: an absolute decomposition method, a network function decomposition method, and/or a service decomposition method in order to implement network functions performed by the physical network device. By virtualizing a physical network device into one or more NFs, the NFs may be distributed and arranged amongst virtual containers and/or hardware resource nodes to minimize operational costs.

The Intel® DPDK environment or any equivalent is used as an example of set of libraries providing primitives for building packet processing environments. Therefore, the proposed embodiments may be implemented with software tools such as the Intel® DPDK environment. It can be based on source code from dpdk.org, any derivative or original software implementation of a packet processing environment. For example, ODP (Open Data Plane) is another alternative mainly focused on ARM families of processors.

Additionally, the word "exemplary" as used herein means serving as an example, instance, or illustration. Any aspect or design described herein as "exemplary" is not necessarily to be construed as preferred or advantageous over other aspects or designs.

Turning now descriptively to the drawings, in which similar reference characters denote similar elements throughout the several views, FIG. 1 shows a host computer (100) running a virtualized environment comprising virtual machines VM1 108, VM2 110, and monitoring virtual machine VM3 112, which may be instantiated by a hypervisor software running on the host 100. The architecture of the hypervisor software may comprise a virtual machine side 104 in which virtual machines of the virtualized environment are instantiated, and a host side 106 in which other software processes of the virtualized environment are instantiated.

It is to be understood virtual nodes executed on the machine side 104 of the hypervisor are sometimes referred to as "guests", whereas virtual nodes executed on the host side 106 of the hypervisor are sometimes referred to as "hosts". For example, data transmission from a virtual node running on the machine side 104 of the hypervisor to a virtual node running on the host side 106 of the hypervisor may be referred to as "guest-to-host", or "VM-to-host" transmission or communication, data transmission from a virtual node running on the host side 106 of the hypervisor to a virtual node running on the machine side 104 of the hypervisor may be referred to as "host-to-guest", or "host-to-VM" transmission or communication, while data communication between two virtual nodes running on the machine side 104 of the hypervisor may be referred to as "guest-to-guest", or "VM-to-VM" transmission or communication.

The processing virtualized environment shown in FIG. 1 also includes a virtual switch node 114 which also may run on the host and be instantiated by the hypervisor on the host side 106 of the hypervisor. The virtual switch node 114 provides the functions of a network switch for data packet or data unit switching between interfaces, it may be referred to as a virtual switch, or "vSwitch", as shown on FIG. 1. The virtual switch node 114 may implement a fast data plane technology, for example based on the DPDK development environment. However, various embodiments of the present invention are not limited to the DPDK development environment and any virtual switch and/or virtual router may be used.

Each of the virtual machines 108-112 may comprise one or several virtual network interfaces 108a-112a. The virtual switch 114 may also include several virtual network interfaces 114a-114c, as illustrated in FIG. 1.

Each of the virtual network interfaces 108a-112a and 114a-114c is associated with a virtual node (e.g., a virtual machine, a virtual switch, or a virtual router, etc.) of the virtualized environment 100, and emulates an interface for data communication between the virtual node to which it is associated and another interface, which may be virtualized, para-virtualized, or non-virtualized, associated with a node, which may be the same or another virtual node, or a non-virtual node, internal or external to the virtualized environment and/or the host computer 100.

In an embodiment, the virtual network interfaces 108a-112a and 114a-114c may implement a virtual network interface card (vNIC) function, such as, for example, a virtual Ethernet port function. A virtual network interface function may implement a virtual interface on which a virtual node (a virtual machine such as VM1 108, VM2 110, VM3 112, or the virtual switch 114) is logically connected so as to send or receive data.

In the example shown in FIG. 1, the first virtual machine 108 runs 2 virtual network interfaces 108a, the second virtual machine 110 runs 2 virtual network interfaces 110a and the monitoring virtual machine 112 runs one virtual network interface 112a. The virtual switch 114 runs two virtual network interfaces 114a and 114b communicatively coupled to the first virtual machine 108 and second virtual machine 110, respectively and one virtual network interface 114c communicatively coupled to the monitoring virtual machine 112. According to embodiments of the present invention, the monitoring virtual machine 112 is configured to monitor all VM-to-VM data communication and port mirroring is used on the virtual switch 114 to send a copy of network packets seen on the virtual interfaces 114a and 114b to a network monitoring connection on the virtual interface 114c communicatively coupled to the monitoring virtual machine 112, as shown in FIG.1.

The virtual machines 108-112 may also be provided with respective operating system (OS) software 108b, 110b, 112b, such as Linux, Windows, Solaris, Android, etc., which may provide typical OS functions for operating a computer (such as memory management, task management, CPU load management, etc.), for example through a kernel OS software (herein referred as an OS kernel" or a "kernel"), and network stack functions 108d and 110d with an interface driver 108c and 110c (provided with the first 108 and second 110 virtual machines). In the case of an OSS 108b and 110b configured for execution on the first virtual machine 108 and second virtual machine 110 provided with one or the plurality of virtual network interfaces 108a, 110a, the interface driver 108c and 110c may be configured for driving respective virtual network interfaces 108a, 110a.

The first 108 and second 110 virtual machines may also be provided with one or more applications 108e, 110e, respectively, while the monitoring virtual machine 112 may be provided with one or more monitoring applications 112e described in greater detail below whose instantiation is managed by respective operating system software (OSS) 108b, 110b and 112b. In one or more embodiments, one or more of the virtual nodes (i.e., first virtual machine 108, second virtual machine 110, monitoring virtual machine 112, and virtual switch 114) may be configured so as to include a fast path data plane technology.

In particular, with respect to the monitoring virtual machine 112, the virtual network interface 112a may be configured to be driven by an OS kernel bypass port which implements a virtual interface function through fast path interface drivers, instead of being configured as an OS kernel port which implements a virtual interface function through interface drivers and network stacks provided in the OS kernel.

For example, as illustrated in FIG. 1 for the monitoring virtual machine 112, the virtual interface driver may be configured to be an OS kernel bypass port or driver, such as, for example, the DPDK Poll Mode Driver (DPDK PMD), in which case network stack functions customized to be interoperable with the DPDK network interface driver may be used in place of network stacks and interface driver (not shown in FIG. 1) provided in the OS 112b running on the corresponding monitoring virtual node 112. As noted above, various embodiments of the present invention are not limited to DPDK environment and contemplate any other suitable environment providing access to a packet capture and processing API.

In various embodiments of the present invention, the DPDK PMD may be configured to operate in two different modes: an interrupt mode and an operation mode. In the operation mode, the DPDK PMD uses a polling mechanism in order to poll the corresponding virtual network interface 112a for new data (network packets) to be processed. The polling rate may be high in order to ensure high rate data processing for various monitoring applications 112e. In contrast, in the interrupt mode, the DPDK PMD may temporarily stop polling the virtual interface 112a. Wake-up and interrupting mechanisms may be implemented in order to transition from the interrupt mode to the operation mode, and from the operation mode to the interrupt mode, respectively.

Network monitoring is an important operational scheme for network operators. It is to be understood the monitoring applications 112e may comprise a plurality of modules which monitor a wide range of network performance data. The monitoring applications 112e may include a user interface 112i that enables a user to interact with the monitoring virtual machine 112 and to obtain data therefrom, whether at the location of installation or remotely. The monitoring applications 112e may also be configured to monitor traffic on the host computer 100 or entire communication network (not shown), as well as to perform various testing and measurement operations, to conduct analysis of collected data, to present data to a user, and the like. Further, typically, the time stamps should preferably be made using the physical hardware clock. However, since in the virtualized environment no general hardware clock signal can be utilized, the monitoring applications 112e may include one or more modules that implement soft clock which can be used for packet timestamping purposes, among others. In one embodiment, the monitoring applications may include a time stamp generating module 112g configured and operable to generate packet timestamps as described below in conjunction with FIG. 2 and a time adjusting module 112h configured and operable to periodically adjust base time utilized by the time stamp generating module 112g as described below in conjunction with FIGS. 6 and 7.

In alternative embodiments, a different designated host computing platform can host the execution of the monitoring virtual machine 112. Further, such designated host computing platform may be configured to monitor a cloud computing environment including a plurality of hosting systems executing a plurality of virtual machines, as long as each virtual machine, including the monitoring virtual machine 112, is communicatively coupled to the virtual switch 114.

It should be noted, because virtual machines work by time-sharing host physical hardware, they cannot exactly duplicate the timing activity of physical machines. Many PC-based operating systems use tick counting to keep time. Typically, the operating system sets up a hardware device to interrupt periodically at a known rate, such as 100 times per second. The operating system then handles these interrupts, called ticks, and keeps a count to determine how much time has passed. Supporting this form of timekeeping accurately in a virtual environment, such as the host 100 shown in FIG. 1 presents a significant challenge. Guest virtual machines without accurate time keeping may experience issues with network applications and processes, as session validity, migration, and other network activities rely on timestamps to remain correct.

Generally, there are a few different clock sources that can be utilized in a virtual environment, such as, but not limited to, TSC (Time Stamp Counter), HPET, APIC (Advanced Programmable Interrupt Controller), KVM_CLOCK and the like. The TSC counts instruction cycles issued by the processor, which can be used as a measure of time. HPET is quite complex and may require at least three hardware timers. On Pentium and later processors, an on-board timer is available to each CPU as part of the APIC. The APIC is accessed through memory-mapped registers and provides interrupt service to each CPU, used for IPIs and local timer interrupts. KVM provides guest virtual machines with a para-virtualized clock (KVM-CLOCK).

Various embodiments of the present invention may be implemented by employing the TSC as a clock source. However, reliably communicating information is important in any network. With the arrival of multi-core CPUs and hibernating operating systems, the TSC cannot be relied on to provide accurate results—unless great care is taken to correct the possible flaws: rate of tick and whether all cores (processors) have identical values in their time-keeping registers. For example, in a multi-core system, each packet in a single packet flow should be timestamped by the same core, because there is no easy method to synchronize TSCs across different cores. Otherwise, timestamp values could get out of sync between different cores or processors. This may be unacceptable in most network applications.

Figure 2:
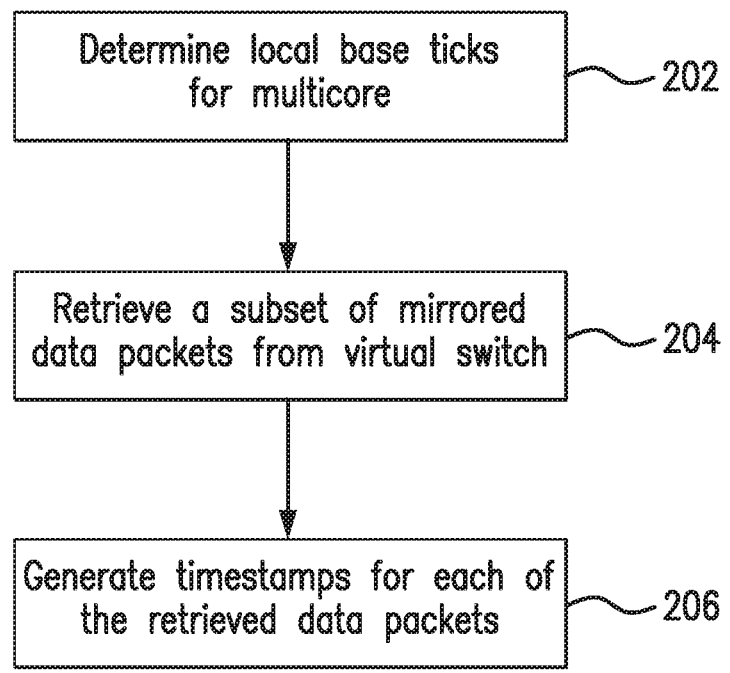
FIG. 2 is a flow diagram of operational steps of the time stamp generating module of FIG. 1 in accordance with an illustrative embodiment of the present invention.
Figure 6:
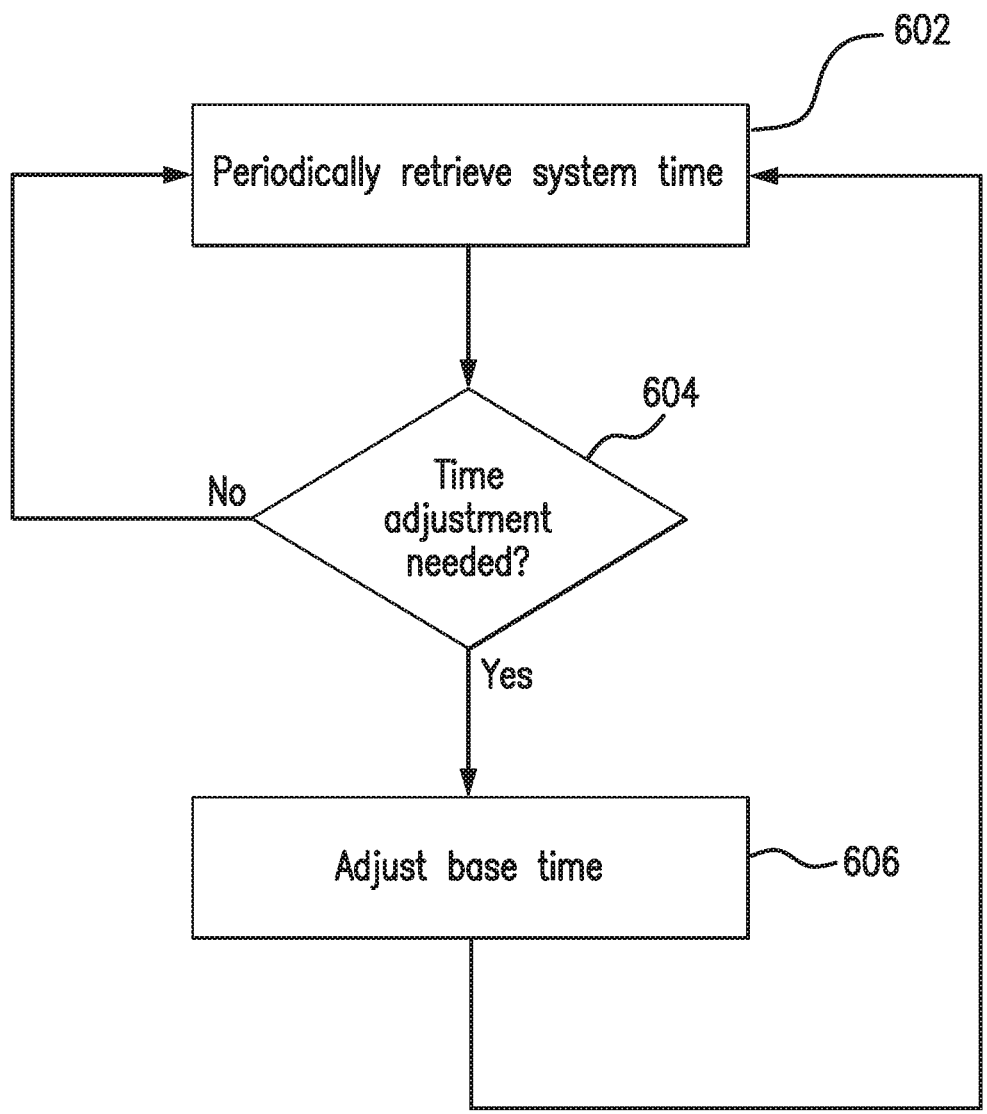
FIGS. 6 and 7 are flow diagrams of operational steps of the time a ting module of FIG. 1 in accordance with an illustrative embodiment of the present invention.
Figure 7:
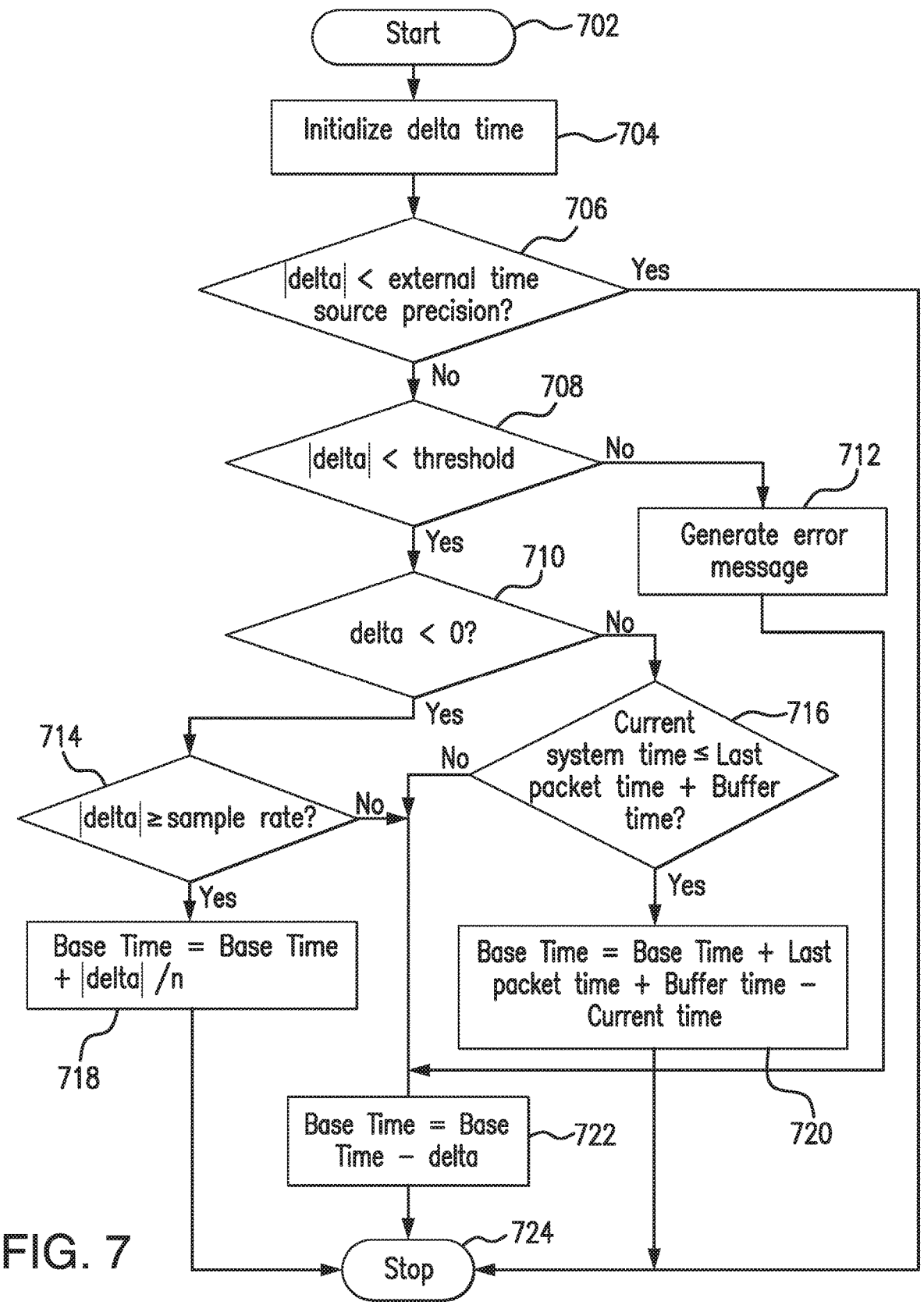

To combat the above problems in NFV environment, the disclosed embodiments provide a software clock that can be easily implemented and that provides the efficiency and accuracy acceptable to a variety of monitoring systems. FIG. 2 is a flow diagram of operational steps of the time stamp generating module 112g of FIG. 1 and FIGS. 6 and 7 are flow diagrams of operational steps of the time adjusting module 112h of FIG. 1 in accordance with an illustrative embodiment of the present invention. Before turning to descriptions of FIGS. 2, 6 and 7, it is noted that the flow diagrams in FIGS. 2, 6 and 7 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

Referring now to FIG. 2, in case the monitoring system includes a plurality of virtual machines 112 implemented on the core processors in multicore platform, upon startup, at 202, the time stamp generating module 112g may determine local base ticks on each core. As noted above, since there is no easy way to synchronize TSCs across different cores, common time reference points, such as base ticks, may vary on different cores. In one embodiment, step 202 may involve the time stamp generating module 112g first determining whether the multiple TSCs are synchronized. In response to determining that the multiple TSCs are synchronized, the time stamp generating module 112g may use base ticks of a master core as a common time reference point for all other cores in multicore platform. If the time stamp generating module 112g determines that the multiple TSC are not synchronized, the timestamp generating module 112g, may calculate, for each core, clock offset ticks between the master core and a particular non-master core and may calculate base ticks of the particular non-master core using the following formula (1):

Base ticks of non-master core=base ticks of master core−clock offset ticks  (1)

where the term "master core" refers to a designated core used by the multi-core monitoring system. This base ticks synchronization enables the local (non-master) TSCs to compensate for variable base ticks. It should be noted that if the multi-core monitoring system utilizes reliable TSC, the calculated clock offset ticks between the master core and each of the non-master cores should remain substantially uniform, thusly eliminating additional base ticks synchronization calculations.

Next, the time stamp generating module 112g repeatedly performs the processing of steps 204 and 206 described below until all the mirrored data packets are retrieved and processed. At 204, the time stamp generating module 112g retrieves a subset of mirrored data packets from the virtual switch 114. As noted above, in one embodiment, the virtual interface driver of the monitoring virtual machine 112 may be configured to be the DPDK PMD. DPDK 112f provides a set of libraries enabling fast packet processing. For example, Ethernet Application Programming Interface (API) provides the rte_eth_rx_burst ( ) function. The time stamp generating module 112g may employ the rte_eth_rx_burst ( ) function to retrieve a subset (batch) of mirrored data packets from a receive queue of the virtual interface 114c communicatively coupled to the monitoring virtual machine 112.

Figure 3:
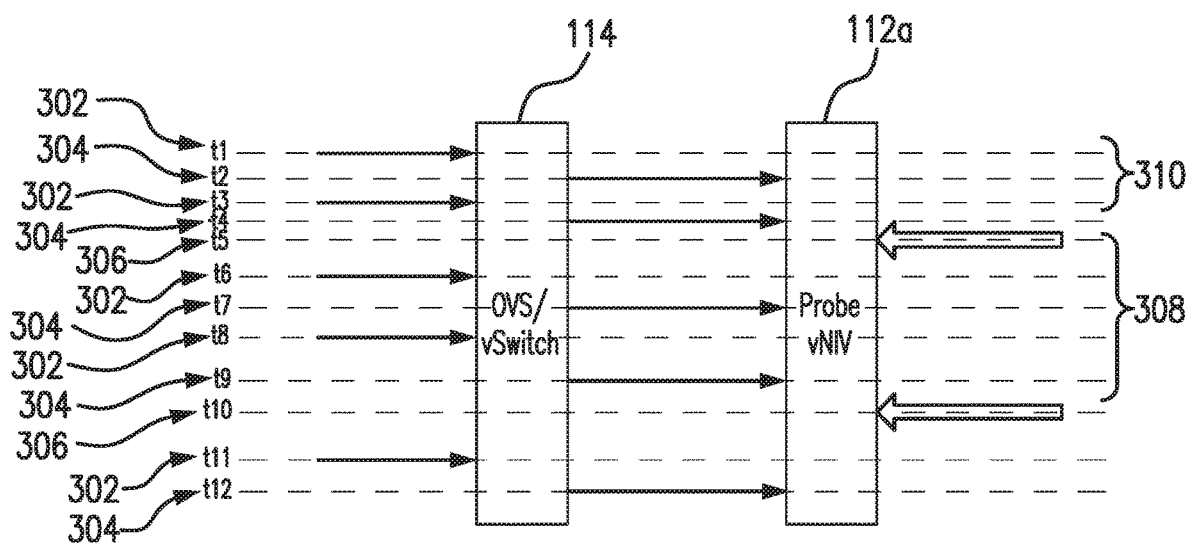
FIG. 3 is a time sequence diagram of an exemplary polling mechanism that may be employed to capture packets in the virtual environment of FIG. 1 in accordance with illustrative embodiments of the present invention.

FIG. 3 is a time sequence diagram of an exemplary polling mechanism that may be employed to capture packets in the virtual environment of FIG. 1 in accordance with illustrative embodiments of the present invention. In FIG. 3, a first plurality of packet arrival instances 302 represents instances in time where a batch of 5 consecutive mirrored data packets is received at the virtual interface 114c. A second plurality of packet arrival instances 304 represents instances in time where each of the mirrored data packets in the illustrated batch is received at the virtual network interface 112a of the monitoring virtual machine 112. A plurality of polling instances 306 represents instances in time where the DPDK PMD performs polling operation. As shown in FIG. 3, the time stamp generating module 112g may utilize the plurality of polling instances 306 as the most accurate time estimation.

Referring back to FIG. 2 now, in accordance with an embodiment of the present invention, once the PMD performs the polling operation, the time stamp generating module 112g may generate timestamps for each of the retrieved data packets (step 206) based on a packet arrival time. In this embodiment, the time stamp generating module 112g may generate timestamps based on the packet arrival time calculated using the following formula (2):

Packet Arrival Time=Polling Time+$i$ nanoseconds  (2), where $i$ represents corresponding packet's index in the logical queue of retrieved packets.

Figure 4:
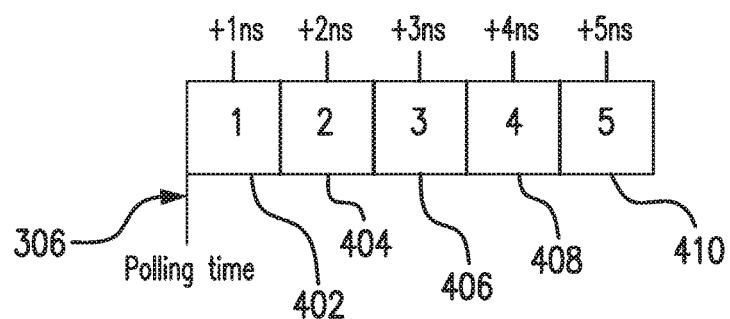
FIG. 4 illustrates an exemplary timestamping process for a batch of received packets in accordance with illustrative embodiments of the present invention.

FIG. 4 illustrates an exemplary timestamping process for a batch (subset) of received packets in accordance with illustrative embodiments of the present invention. In this example, five different packets 402-410 are fetched at once at the same polling instance. Thus, according to formula (2), the time stamp generating module 112g generates distinct time stamps for each of the packets 402-410 retrieved at the same polling instance. Although for purposes of simplicity of illustration, the batch of packets shown in FIG. 4 contains only five packets, various embodiments of the present invention contemplate that the time stamp generating module 112g may utilize any suitable batch size.

Further, according to an embodiment of the present invention, the time stamp generating module 112g may calculate the Polling Time in formula (2) above using the following formula (3):

$$\text{Polling Time} = \text{Base Time} + \text{Delta Time} \quad (3)$$

where Base Time refers to a system time computed by one of the time based library functions provided by OS 112b (i.e., Linux library functions) and where two different components of Delta Time (seconds component and nanoseconds component) may be computed using formulas (4) and (5), respectively:

$$\text{Delta Time(s)} = (\text{Current Ticks} - \text{Base Ticks})/\text{TPS} \quad (4)$$

$$\text{Delta Time (ns)} = ((\text{Current Ticks} - \text{Base Ticks}) \% \text{TPS}) * \text{*nanoseconds per second}/\text{TPS} \quad (5)$$

where TPS represents Ticks Per Second and should be substantially uniform when TSC is a stable time source reference and where Base Ticks represents the common time reference point determined at step 202.

It should be noted that in an alternative embodiment, the time stamp generating module 112g may generate timestamps by calculating the Packet Arrival Time in formula (2) above based on the second plurality of packet arrival instances 304 representing instances in time where each of the mirrored data packets in the illustrated batch is received at the virtual network interface 112a of the monitoring virtual machine 112. In this embodiment, the accuracy of the generated time stamps depends on the size of polling window 308 shown in FIG. 3. For illustrative purposes only, assume that the batch size is 32 packets, TPS is 2G, the packet processing time is approximately 350 ticks and the receiving queue of the virtual network interface 112a is 4096, then the time stamp generating module 112g may utilize the polling window 308 of approximately 5 microseconds:

$$\text{Polling window} = \text{batch size} * \text{packet processing time}/\text{TPS} = 32 * 350/2000000000 \approx 5 \, \mu s.$$

Further, the time window between the packet arrival time of the earliest packet and polling time, shown as window 310 in FIG. 3 can be calculated as follows:

$$\text{Polling window} * (\text{size of the receiving of the virtual interface}/\text{batch size}) = 5 \, \mu s * (4096/32) \approx 712 \, \mu s.$$

It should be noted that the above formula (2) ensures that the packet arrival time of the last packet in the batch will not exceed the polling window 308. In other words, according to an embodiment of the present invention, the time stamp generating module 112g always generates a timestamp for the last packet in a first batch (retrieved subset of packets) that is less than the timestamp generated for the first packet of a subsequent batch. Since the sensitivity of majority of monitoring applications 112e is limited to seconds, the deviation in milliseconds is acceptable in this embodiment.

Figure 5:
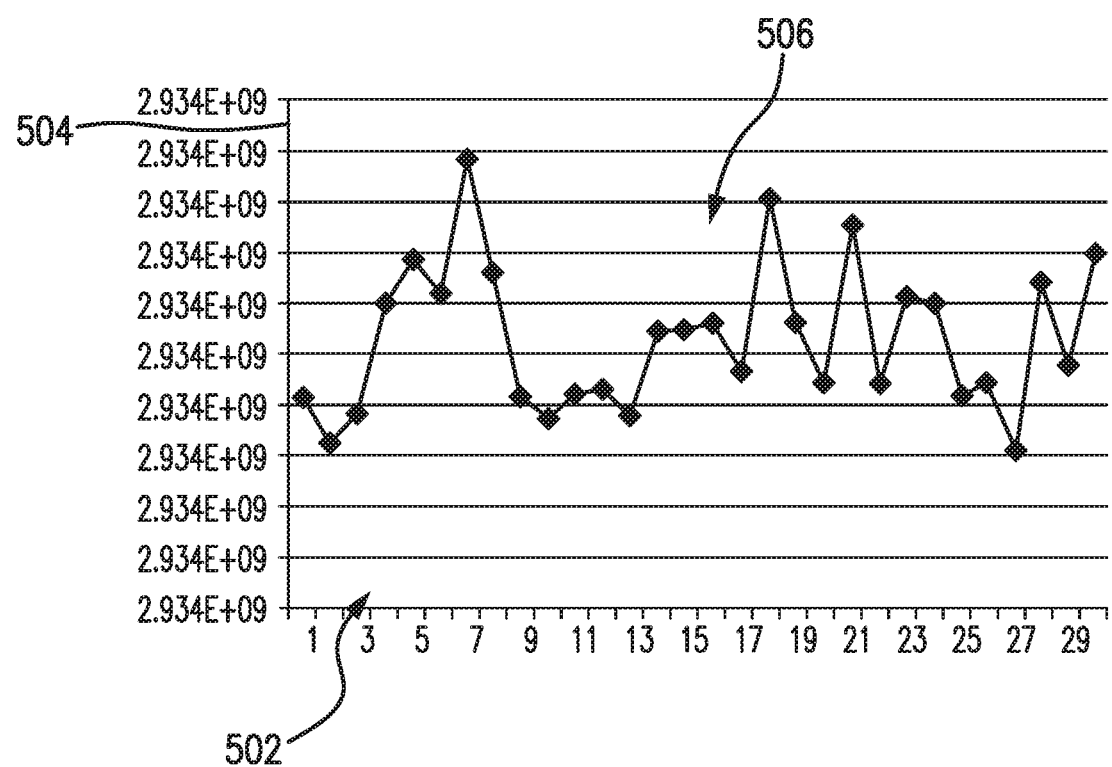
FIG. 5 is graph illustrating ticks per second values provided by the Data Plane Development Kit (DPDK) of FIG. 1 in accordance with illustrative embodiments of the present invention.

According to an embodiment of the present invention, TPS values in formulas (4) and (5) may be provided by the DPDK 112f. However, the precision of the provided values may be less than the desired precision. Overtime TPS values may drift away from the ideal as the time source (i.e., DPDK) drifts away from the nominal operating frequency. So the current clock tick frequency may differ from the nominal. FIG. 5 is a graph 506 illustrating ticks per second values provided by the DPDK of FIG. 1 in accordance with illustrative embodiments of the present invention. The clock tick count is measured along the y-axis 504. An update rate (or the period of time in seconds that must elapse before significant updates are made) is measured along the "x axis" 502. As shown in FIG. 5, TPS values provided by the DPDK 112f are not sufficiently stable to provide desirable precision. Thus, according to an embodiment of the present invention, the disclosed software calculates TPS values several times (e.g., at system start up) and determines an average of the calculated TPS values.

As noted above, the time adjusting module 112h is configured and operable to periodically adjust base time utilized by the time stamp generating module 112g based on the correct external time. Referring now to FIG. 6, there is shown a flow diagram of operational steps of the time adjusting module of FIG. 1 in accordance with an illustrative embodiment of the present invention. At 602, the time adjusting module 112h may periodically retrieve system time from the OS 112b. In turn, the OS 112b may periodically synchronize its clock with an external network time source. In one embodiment, such external time source may comprise an NTP (Network Time Protocol) server (not shown in FIG. 1) communicatively coupled to the host 100. NTP is generally used for supporting the distribution of time (and thus frequency) over Packet Switched Networks. NTP relies on UDP (User Datagram Protocol) or TCP/IP (Transmission Control Protocol/Internet Protocol).

Next, at 604, the time adjusting module 112h determines whether the base time utilized by the time stamp generating module 112g should be adjusted. The time adjusting module 112h should keep the adjustment period substantially consistent with the adjusting cycle time of the external time synchronization service (i.e., NTP). In one embodiment, the time adjusting module 112h may determine whether the base time should be adjusted by using the following formula:

$$\text{Adjustment Period} = \text{Adjusting Cycle Time of Synchronization Service} + 1 \, \text{ms} \quad (6),$$

where the synchronization service can be NTP in one embodiment (the NTP time can be inquired at one-minute intervals, for instance). In other words, at step 604, the time adjusting module 112h ensures that system clock synchronization with the external time source takes place between two consecutive base time adjustment operations. If the adjustment period determined using formula (6) has not yet expired (decision block 604, "No" branch), the time adjusting module 112h returns back to step 602. In response to determining that the adjustment period has expired (decision block 604, "Yes" branch), at 606, the time adjusting module 112h performs adjustment of base time utilized by the time stamp generating module 112g. It should be noted that the decentralized base time calculated by the time stamp generating module 112g would have to be corrected continuously as the Base Time specified by the above formula (3) has only a limited accuracy which results in a timestamp clock operation which is either too slow or too fast as compared to the external reference time source. As will be further described below, by performing such base time adjustment, the time adjusting module 112h also substantially prevents any out of sequence errors for the data packets timestamped by the time stamp generating module 112g and subsequently processed by one or more monitoring applications 112e.

Referring now to FIG. 7, there is shown a flow diagram of operational steps for performing the base time adjustment step of FIG. 6 by the time adjusting module 112h of FIG. 1 in accordance with an illustrative embodiment of the present invention. The procedure starts at step 702. At 704, the time adjusting module 112h initializes a delta time variable indicative of the difference between the current time maintained by the time stamp generating module 112g and the system time synchronized with an external time source. Such initialization may include determining a difference between the current time and the synchronized system time and setting the value of the delta time variable to the determined difference.

Next, at 706, the time adjusting module 112h compares the absolute value of the delta time variable with the level of precision of the external time source. According to an embodiment of the present invention, if the absolute difference value determined at step 704 is smaller than the precision level of the external time source then there is no need for the time adjusting module 112h to adjust the base time value. For instance, if NTP service is used for clock synchronization purposes and if NTP's precision level is approximately equal to 100 ms and the absolute difference is approximately 50 ms, such drift typically is not significant enough to warrant performing base time adjustment calculations described below. Accordingly, if the time adjusting module 112h determines that the value of the delta time variable is smaller than the precision level of the external time source (decision block 706, "Yes" branch), the time adjusting module 112h stops the procedure at step 724. Otherwise (decision block 706, "No" branch), at 708, the time adjusting module 112h compares the absolute difference value with a predetermined time threshold indicative of computational problems incurred during previous base time computations. In one embodiment, the predefined time threshold can be between approximately 3 seconds and approximately 7 seconds. It should be noted that clock drift deviations greater than the predefined threshold may adversely affect processing of the timestamped packets by a variety of monitoring applications, such as, but not limited to, Multiple Protocol Correlation (MPC) systems. As shown in FIG. 7, in response to determining that the absolute value of the delta time variable is greater than the predetermined time threshold (decision block 708, "No" branch), at step 712, the time adjusting module 112h may generate a corresponding error message and/or increase corresponding error statistics and may proceed to step 722 described below. If the value of the delta time variable is less than the predetermined time threshold (decision block 708, "Yes" branch), the time adjusting module 112h proceeds to the evaluation of decision block 710.

According to an embodiment of the present invention, at 710, the time adjusting module 112h determines whether the current time maintained by the time stamp generating module 112g drifted ahead or behind the synchronized system time. If the current time maintained by the time stamp generating module 112g drifted behind, the time adjusting module 112h should increase the base time. Further, at least some of the monitoring applications 112e may include traffic analyzing applications. Generally, information related to flow of data in a network could be exported as datagram packets to a configured traffic analyzing engine (also known as flow collectors) for further analysis and reporting. Flow collectors analyze flow records received in exported datagrams (exported packets) and present the analysis in form of reports. At times when ongoing network traffic increases, volume of corresponding flow statistics (flow records getting exported) also increases. The computation of traffic volume is based on the packet timestamps. If $T \geq t_0$ and $T < t_0 +$ sampling rate, then the traffic volume of a sampling window should be increased by S, where a sampling time window may be $[t_0, t_0+$sampling rate$)$, packet is denoted by P, packet's timestamp is denoted by T and packet's size is denoted by S. In the case of |delta time variable|>sampling rate, if the time adjusting module 112h simply advances base time to base time+|delta time|, then $T_2-T_1>$sampling rate, where $T_1$ is the timestamp of the last packet received before adjusting time and $T_2$ is the timestamp of the first packet received after adjusting base time. To be clear in these regards, this typically means that there will be a sampling window without any packet timestamps falling within such window. In this example, from a perspective of traffic volume reporting, there appears to be a gap in traffic. However, such gap is not a real traffic gap indicative of no traffic during the sampling window. Instead, in this case, the appearance of the artificial gap in traffic is caused by system's incorrect timestamping due to "time source drifting" in virtual environment. Thus, advantageously, the base time adjusting methodology described herein enables taking into account the sampling rate of the traffic analyzing applications to avoid such artificial traffic gaps.

Based on the above, in response to determining that the current time maintained by the time stamp generating module 112g drifted behind the synchronized system time (decision block 710, "Yes" branch), at 714, the time adjusting module 112h compares the calculated value of the delta time variable with the predefined sampling rate of the one or more traffic analyzing applications running on the monitoring virtual machine 112. If the value of the delta time variable is greater than or equal to the predefined sampling rate (decision block 714 "Yes" block), the time adjusting module 112h increases the current base time by some quotient of the delta time variable value (step 718). In other words, at 718, the time adjusting module 112h increases the base time by |delta|/n value. If, for instance, n=2, double increment of the current base time by |delta|/n value effectively makes the base time equal to the synchronized system time. Advantageously, this adaptive increment of base time ensures that there is at least some sampled information (i.e., at least some timestamped packets) in each sampling flow record. In response to determining that the value of the delta time variable is less than the predefined sampling rate (decision block 714 "No" block), the time adjusting module 112h increases/decreases the current base time by the calculated value of the delta time variable (step 722).

It should be further noted that if the current time maintained by the time stamp generating module 112g drifted ahead of the synchronized system time, the time adjusting module 112h cannot simply align these time values without taking into consideration time stamps that have been already generated by the time stamp generating module 112g because such alignment could lead to subsequently generated time stamps being out of sequence. Advantageously, the time adjusting module 112h is enabled to dynamically adjust base time based upon the last timestamp generated by the time stamp generating module 112g. Further, execution of the steps 704-722 by the time adjusting module 112h introduces an additional cost factor with respect to time.

Based on the above, according to an embodiment of the present invention, in response to determining that the current time maintained by the time stamp generating module 112g drifted ahead of the synchronized system time (decision block 710, "No" branch), at 716, the time adjusting module 112h compares the synchronized system time with the sum of the time stamp value generated for the last packet processed by the time stamp generating module 112g and the buffer time denoting additional time interval reserved for execution of the steps 704-722 by the time adjusting module 112h. In one embodiment, a default buffer time (measured in nanoseconds) may be calculated by adding 10 to the size of mirrored packets retrieved by the time stamp generating module 112g (referred to above as "batch size"). If the synchronized system time is less than or equal to the aforementioned sum (decision block 716, "Yes" branch), at 720, the time adjusting module 112h aligns the base time with the last timestamp generated by the time stamp generating module 112g. In one embodiment, at 720, the time adjusting module 112h may calculate the base time using the following formula (7):

Base Time=Base Time+Last packet time+Buffer time−Current time (7), where the Last packet time represents the latest time stamp generated by the time stamp generating module 112g, the Buffer time represents additional time reserved for execution of the time adjusting technique disclosed herein and the Current time represents the synchronized system time. As noted above, step 720 ensures that the next time stamp value generated by the time stamp generating module 112g after the base time adjustment will be greater than the previously generated timestamp value. In response to determining that the synchronized system time exceeds the aforementioned sum (decision block 716 "No" block), the time adjusting module 112h increases/decreases the current base time by the calculated value of the delta time variable (step 722) before stopping the procedure (step 724).

In summary, various embodiments of the present invention disclose a novel, efficient and seamless approach to generating timestamps for captured data packets in a virtualized NFV environment. In at least some embodiments, the disclosed approach enables timestamp generation in approximately 300 cycles. Further, the disclosed approach meets the specific needs of other monitoring applications running in the virtualized environment. For instance, as noted above, the disclosed mechanism is enabled to ensure that all time stamps associated with the plurality of packets in one flow are in proper sequence and that that there is at least some sampled information (i.e., at least some time-stamped packets) in each sampling flow record. Additionally, as yet another benefit of the disclosed embodiments, the disclosed timestamp generation can be performed with a desired accuracy consistent with other time-based system functions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A monitoring system comprising:
a host computer executing a plurality of virtual machines, at least one of the plurality of virtual machines comprising a monitoring virtual machine;
a virtual switch with a plurality of virtual Network Interface Cards (vNICs), wherein each vNIC of the plurality of vNICs is associated with a virtual machine of the plurality of virtual machines; and
a monitoring virtual machine having a packet capture Application Program Interface (API), the monitoring virtual machine coupled to the virtual switch and executed by the host computer, wherein the monitoring virtual machine comprises at least one of the plurality of virtual machines, wherein the virtual switch is configured to mirror a plurality of data packets exchanged between two communicating virtual machines to a vNIC associated with the monitoring virtual machine and wherein the monitoring virtual machine is configured and operable to:
retrieve the plurality of mirrored data packets from the vNIC associated with the monitoring virtual machine; and
generate timestamps indicative of packet arrival time at the virtual switch for each data packet in the retrieved plurality of mirrored data packets based, at least in part, on a computed base time;
receive system time from an external time source;
periodically adjust the computed base time by calculating a time difference between its internal current time and the system time received from the external time source and wherein the internal current time is derived from the computed base time;
wherein the monitoring virtual machine is configured and operable to determine whether the internal current time is behind the system time received from the external time source and further configured to adjust the computed base time responsive to the determination by reducing the computed base time so that the computed base time is bounded by a sampling rate of one or more traffic analyzing applications executed by the monitoring virtual machine.

2. The monitoring system of claim 1, wherein the monitoring virtual machine is executed by another host computer different from the host computer executing the plurality of virtual machines being monitored.

3. The monitoring system of claim 1, wherein the monitoring virtual machine is configured to adjust the computed base time only if the calculated time difference exceeds precision level of the external time source.

4. The monitoring system of claim 1, wherein the monitoring virtual machine is configured and operable to determine whether the internal current time is ahead of the system time received from the external time source and further configured to adjust the computed base time responsive to the determination by aligning the computed base time ahead of a timestamp associated with a latest retrieved packet in the plurality of mirrored data packets.

5. The monitoring system of claim 1, wherein the packet capture API comprises a Data Plane Development Kit (DPDK) having a Poll Mode Driver (PMD) and wherein the monitoring virtual machine is further configured to retrieve the plurality of mirrored data packets using the PMD.

6. The monitoring system of claim 5, wherein the timestamps are generated using the equation:

Packet Arrival Time=Polling Time+$i$ nanoseconds, where $i$ represents packet's index in a subset of the retrieved plurality of mirrored data packets.

7. The monitoring system of claim 6, wherein the Polling Time is estimated based on the computed base time.

8. A method for monitoring a plurality of virtual machines communicatively coupled to a virtual switch with a plurality of virtual Network Interface Cards (vNICs) using a monitoring virtual machine communicatively coupled to the virtual switch, the method comprising:
- mirroring, by the virtual switch, a plurality of data packets exchanged between two communicating monitored virtual machines to a vNIC associated with the monitoring virtual machine;
- retrieving, by the monitoring virtual machine, the plurality of mirrored data packets from the vNIC associated with the monitoring virtual machine;
- generating, by the monitoring virtual machine, timestamps indicative of packet arrival time at the virtual switch for each data packet in the retrieved plurality of mirrored data packets based, at least in part, on a computed base time;
- receiving, by the monitoring virtual machine, system time from an external time source;
- periodically adjusting, by the monitoring virtual machine, the computed base time by calculating a time difference between its internal current time and the system time received from the external time source and wherein the internal current time is derived from the computed base time; and
- determining, by the monitoring virtual machine, whether the internal current time is behind the system time received from the external time source.

9. The method of claim 8, wherein the plurality of virtual machines is executed by at least one host computer and wherein the monitoring virtual machine is executed by another host computer different from the at least one host computer executing the plurality of virtual machines being monitored.

10. The method of claim 8, further comprising determining, by the monitoring virtual machine, whether the internal current time is ahead of the system time received from the external time source and adjusting the computed base time responsive to the determination by aligning the computed base time ahead of a timestamp associated with a latest retrieved packet in the plurality of mirrored data packets.

11. The method of claim 8, further comprising adjusting the computed base time responsive to the determination by reducing the computed base time so that the computed base time is bounded by a sampling rate of one or more traffic analyzing applications executed by the monitoring virtual machine.

12. The method of claim 8, wherein retrieving the plurality of mirrored data packets comprises retrieving the data packets using a Data Plane Development Kit (DPDK) having a Poll Mode Driver (PMD).

13. The method of claim 8, wherein the timestamps are generated using the equation:

Packet Arrival Time=Polling Time+$i$ nanoseconds, where $i$ represents packet's index in a subset of the retrieved plurality of mirrored data packets.

14. The method of claim 13, further comprising estimating the Polling Time based on the computed base time.

15. A monitoring system comprising:
- a plurality of host computers executing a plurality of virtual machines;
- a virtual switch with a plurality of virtual Network Interface Cards (vNICs), wherein each vNIC of the plurality of vNICs is associated with a virtual machine of the plurality of virtual machines;
and
- a monitoring host computer executing a monitoring virtual machine having a packet capture Application Program Interface (API), the monitoring virtual machine coupled to the virtual switch, wherein the virtual switch is configured to mirror a plurality of data packets exchanged between two communicating virtual machines to a vNIC associated with the monitoring virtual machine and wherein the monitoring virtual machine is configured and operable to:
  - retrieve the plurality of mirrored data packets from the vNIC associated with the monitoring virtual machine; generate timestamps indicative of packet arrival time at the virtual switch for each data packet in the retrieved plurality of mirrored data packets based, at least in part, on a computed base time;
  - periodically adjust the computed base time by calculating a time difference between its internal current time and a system time received from the external time source, wherein the internal current time is derived from the computed base time;
  - receiving system time from an external time source;
  - periodically adjusting the computed base time by calculating a time difference between its internal current time and the system time received from the external time source and wherein the internal current time is derived from the computed base time; and
  - determining whether the internal current time is behind the system time received from the external time source.

* * * * *